United States Patent [19]

Baba

[11] 4,042,072
[45] Aug. 16, 1977

[54] PISTON-CYLINDER UNIT FOR USE IN A DISC BRAKE ASSEMBLY

[75] Inventor: Takashi Baba, Toyota, Japan

[73] Assignee: Toyota Jidosha Kogyo Kabushiki Kaisha, Toyota, Japan

[21] Appl. No.: 620,266

[22] Filed: Oct. 7, 1975

[30] Foreign Application Priority Data

Mar. 28, 1975  Japan .................................. 50-36901

[51] Int. Cl.² ........................ F16D 55/12; F16D 65/74
[52] U.S. Cl. ..................................... 188/71.8; 92/13.5; 92/34; 188/72.4; 188/196 P; 188/370; 192/111 A
[58] Field of Search .................... 188/71.8, 72.4, 72.5, 188/370, 196 P; 192/111 A, 85 R; 92/13.5, 34, 92

[56] References Cited

U.S. PATENT DOCUMENTS

| 2,359,516 | 10/1944 | Frank | 188/72.4 X |
| 3,277,983 | 10/1966 | Jeffries | 188/196 P |
| 3,589,481 | 6/1971 | Motsch et al. | 188/370 X |
| 3,659,685 | 5/1972 | Stipanovic | 188/71.8 X |

Primary Examiner—Trygve M. Blix
Assistant Examiner—Douglas C. Butler
Attorney, Agent, or Firm—Finnegan, Henderson, Farabow & Garrett

[57] ABSTRACT

A piston-cylinder unit for use in a disc brake assembly includes a cylinder and a hydraulically actuated piston received in the cylinder for axial movement therein. The unit has a flexible seal member with its opposite ends attached in sealing engagement to respective axially opposed portions of the piston and cylinder for elastic expansion and contraction in the axial direction. The flexible seal member and the opposing portions of the piston and cylinder form a chamber for receiving fluid pressure for actuation of the piston.

18 Claims, 4 Drawing Figures

PISTON-CYLINDER UNIT FOR USE IN A DISC BRAKE ASSEMBLY

BACKGROUND OF THE INVENTION

This invention relates to a piston-cylinder unit. More particularly, this invention relates to a piston-cylinder unit for use in a disc brake assembly. The piston-cylinder units of the invention are particularly well suited to be used in disc brake assemblies for automobiles.

Throughout the specification, numerous references will be made to the use of the piston-cylinder unit in an automotive disc brake assembly. However, it should be realized that the invention could be used in other types of piston-cylinder unit assemblies.

As well known in the art, automobile disc brake assemblies include such types as fixed caliper and floating caliper. In the fixed caliper type, a caliper member is secured to the vehicle body and is located adjacent to a peripheral portion of the brake disc secured to a rotating wheel axle. The caliper member has a piston-cylinder unit mounted in the inner side of each of its two arm sections. Each piston has an end, adjacent to a side of the brake disc, which is provided with a brake pad. The pad is generally forced against the side of the brake disc during braking action when hydraulic pressure from a master cylinder actuates the piston.

In a disc brake assembly of the floating caliper type, a caliper member is slidably attached to the vehicle body. The caliper member has a piston-cylinder unit mounted on the inner side of one of its two arm sections. The piston has an end, adjacent to one side of the brake disc, which is provided with a brake pad. The brake pad is generally forced against the side of the brake disc during braking action when hydraulic pressure from a master cylinder actuates the piston. A reaction force of the brake pad located on the piston being forced against the brake disc causes a movement of the caliper member in a direction opposite to the axial movement of the piston. This reaction force causes a brake pad which is attached to the inner side of the other arm section of the caliper member to be simultaneously pressed against the other side of the brake disc so that a complete braking action is effected.

In the conventional piston-cylinder unit used in the aforementioned disc brake assemblies, it is necessary to provide a seal between the piston and the cylinder which is subjected to fluid pressure during hydraulic actuation of the piston. The seal is generally accomplished by a seal ring fitted into an annular groove formed on the inner peripheral surface of the cylinder or the outer circular wall of the piston. The seal ring is urged against either the piston wall of the cylinder surface with an initial radial stress or strain produced in it. Due to this radial stress, a frictional force exists between the seal ring and the surface of the piston or cylinder in contact with the seal ring at time of axial movement of the piston in the cylinder. Because of this frictional force, some of the braking force of the brake pad against the brake disc is lost.

In addition to this braking force loss, a frequent problem has been encountered in that the hydraulically actuated piston will not return to its initial axial position when the fluid pressure on the piston is removed. Consequently, the brake pad carried by the piston may remain in contact with the rotating brake disc so as to create an unwanted "dragging" effect. On the other hand, if the piston is brought to an axial position beyond its initial axial position during the return stroke, a shortage of the operating fluid pressure could result in a subsequent braking operation. This shortage would occur because of the increased stroke of the piston necessary to attain a braking action.

Accordingly, it is a primary object of this invention to provide a new and improved piston-cylinder unit having a flexible seal member so as to improve the action force of the piston by eliminating friction loss from a sealing member between the piston and the cylinder.

A still further object of this invention is to provide a new and improved piston-cylinder unit which can be used in automotive disc brake assemblies to eliminate the above-described problems.

Another object of this invention is to provide a new and improved piston-cylinder unit for use in a disc brake assembly that will prevent dragging of the brake pad against the rotating brake disc.

Still another object of this invention is to provide a new and improved piston-cylinder unit for use in a disc brake assembly that will keep the piston from being brought to a return axial position greater than its initial axial position and thus prevent a shortage of operating fluid pressure from occurring in a subsequent braking operation.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the piston-cylinder unit of this invention comprises (1) a cylinder; (2) a hydraulically actuated piston received in the cylinder for axial movement therein; and (3) a flexible seal member having a first end attached in sealing enggement to the head of the piston and a second end attached in sealing engagement to the cylinder axially opposed to the piston head for elastic expansion and contraction in an axial direction, the flexible seal member defining between the piston head and the cylinder a chamber for receiving fluid pressure for actuation of the piston.

Preferably, the flexible seal member comprises a bellows. It is also preferred that the piston-cylinder unit include flexible means interconnecting the circular wall of the piston and the opposing wall of the cylinder for preventing particles such as dust and water droplets from entering between the piston and the cylinder.

The invention consists in the novel parts, constructions, arrangements, combinations and improvements shown and described. The accompanying drawings, which are incorporated in and constitute a part of this specification, illustrate several embodiments of the invention and, together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Figure 1:
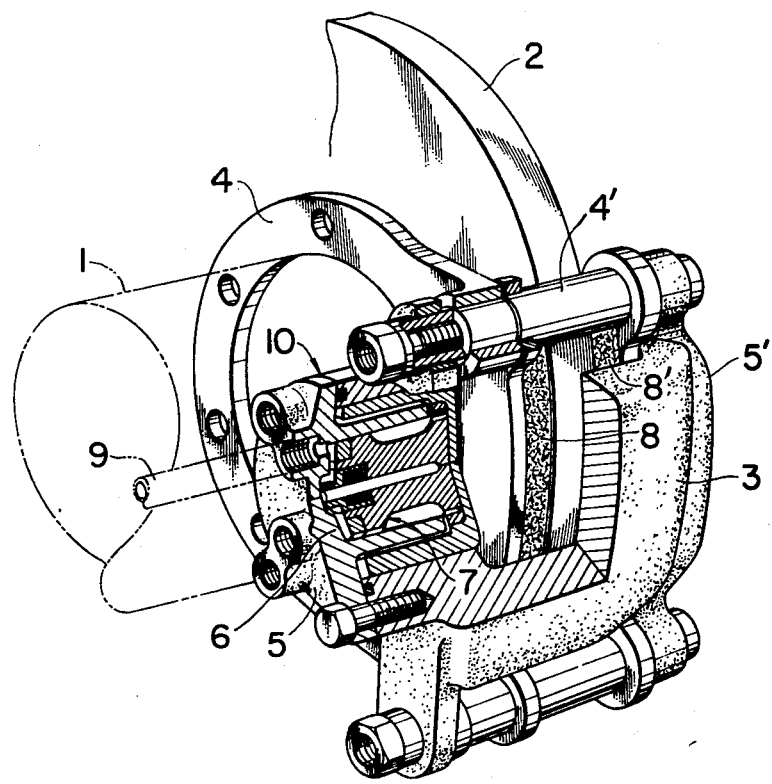
FIG. 1 is a perspective view, partly in section, of a disc brake assembly of a floating caliper type.

Referring now to FIG. 1, as well known in the art, a vehicle disc brake assembly of a floating caliper type is shown. A rotating wheel axle 1 carries a brake disc 2 secured to it. A caliper member 3 is provided which is positioned along a peripheral portion of brake disc 2 and which is supported by a support member 4 secured to the vehicle body. Caliper member 3 is located as such to be slidable along a guide pin 4' that extends parallel to wheel axle 1. It is preferred that caliper member 3 have two arm sections 5 and 5'. On the inner side of arm section 5 there is provided a pot-shaped cylinder 6 of a piston-cylinder unit, generally shown as 10, having one end open and facing one side of brake disc 2. A hydraulically actuated piston 7 of piston-cylinder unit 10 is received in cylinder 6 for axial movement therein and has one end positioned in the open end of cylinder 6 facing brake disc 2. A brake pad member 8 is attached to the end of piston 7 so as to be located adjacent to one side of brake disc 2. The inner side of the other arm section 5' of caliper 3 is provided with a brake pad member 8'. Fluid pressure may be supplied to cylinder 6 through duct 9 from a master cylinder not shown.

When fluid pressure is supplied to cylinder 6, piston 7 is slidably moved in clyinder 6 so that brake pad member 8 is brought into engagement with one side of brake disc 2. At the same time, a reaction force created from the movement of piston 7 causes caliper member 3 to move along guide pin 4' in a direction opposite to the axial moveement of piston 7. This results in brake pad member 8' being brought into engagement on the other side of brake disc 2. A complete braking action on rotating brake disc 2 is therefore effected.

Figure 2:
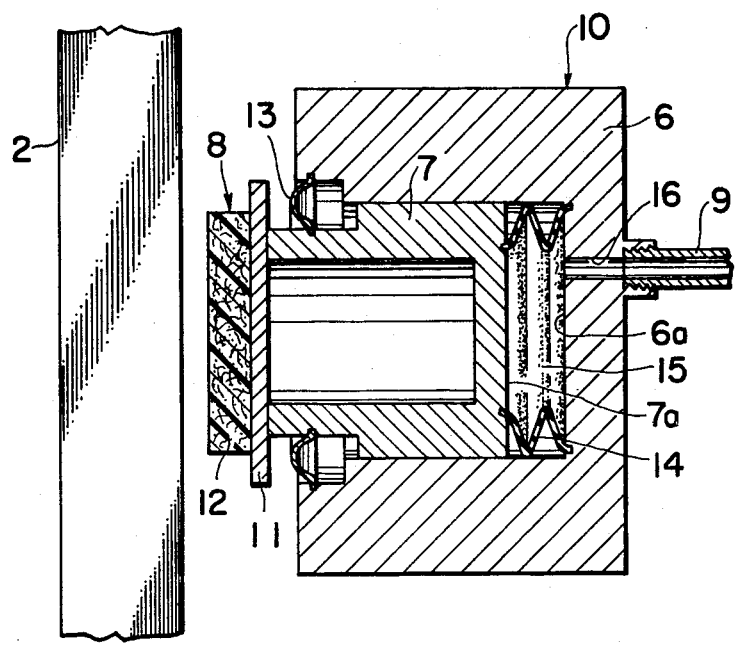
FIG. 2 is a sectional view of a piston-cylinder unit employing the teachings of this invention for use in the disc brake assembly of FIG. 1.

Referring now to FIG. 2, piston-cylinder unit 10, in accordance with the invention, is shown in detail as used in the disc brake assembly of FIG. 1. Preferably, brake pad member 8 included a backing plate 11 secured to the end of piston 7 facing brake disc 2 and a brake pad 12 attached to backing plate 11 so as to be located adjacent to brake disc 2. Flexible means, such as annular dust-proof boot 13, if provided interconnecting the circular wall of piston 7 and the opposing wall of cylinder 6 to prevent dust or water drops from entering between piston 7 and cylinder 6.

In accordance with the invention, a flexible seal member 14 is provided having a first end attached in seal engagement to the head 7a of piston 7 and a second end attached in sealing engagement to cylinder 6 axially opposed to piston head 7a at 6a. Preferably, flexible seal member 14 comprises a bellows. However, a steel plate spring, diaphragm, or the like may also be used. Seal member 14, together with cylinder portion 6a and piston head 7a, define a chamber 15. Chamber 15 is capable of receiving fluid pressure for actuation of piston 7. It is preferred that chamber 15 be communicated with a fluid pressure supply by a duct 9 through an aperture 16 formed in cylinder 6.

During the operation of piston-cylinder unit 10, piston 7 is actuated for movement in an axial direction by pressurized fluid being supplied and exhausted from chamber 15. This causes a force to act against piston head 7a. Flexible seal member 14 undergoes expansion or contraction in an axial direction when piston 7 moves. Seal member 14 is designed so as to withstand fluid pressure introduced into chamber 15 and is capable of elastic deformation within a range corresponding to the forward and return strokes of piston 7 within cylinder 6. As previously mentioned, brake pad 12 is brought into engagement with brake disc 2 to effect a braking action when piston 7 is actuated.

Figure 3:
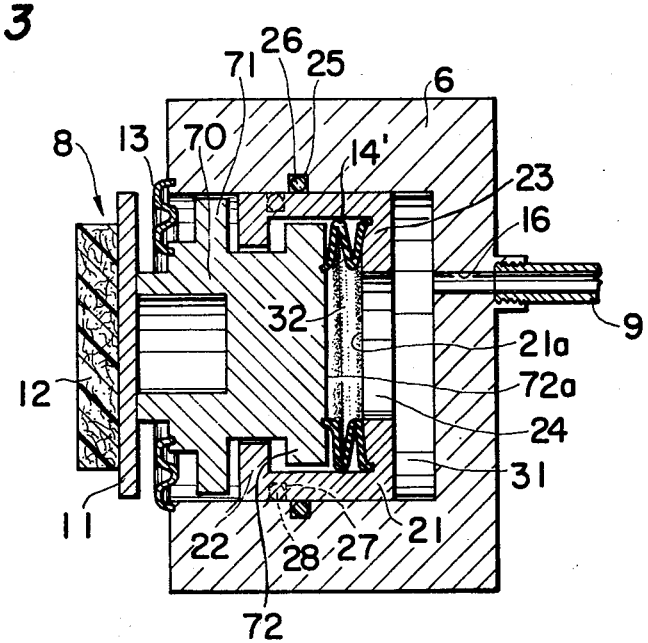
FIG. 3 is a sectional view of another embodiment of the piston-cylinder unit employing the teachings of this invention for use in the disc brake assembly of FIG. 1.

Another embodiment of the piston-cylinder unit of this invention for use in a disc brake assembly is shown in FIG. 3. In this embodiment, the initial axial position of a piston 70 with respect to cylinder 6 is automatically adjusted to another axial position with respect to cylinder 6 in accordance with the wear of brake pad 12. This ensures a consistent braking action against brake disc 2 in subsequent braking operations.

In accordance with the invention, piston 70 has two radial projections 71 and 72 on its peripheral surface. Preferably, radial projection 71 is located at the end of piston 7 near brake pad member 8. Radial projection 71 has a greater radial dimension than projection 72 and is axial guided along the inner peripheral surface of cylinder 6. Projection 72 of piston 7 is a shoulder located parallel to the piston head 70a and is axially guided along the inner peripheral surface of an auxiliary cylinder 21. Auxiliary cylinder 21 is received in cylinder 6 for movement with respect thereto in an axial direction.

In accordance with the invention, a seal member is located on at least one of the mutually engaging surfaces of cylinders 6 and 21 and radially urged against the opposite surface for tending to maintain cylinder 21 in an axial position with respect to cylinder 6. Preferably, a flexible seal ring 26 is located in an annular groove 25 so as to be held in contact with the outer peripheral surface of auxiliary cylinder 21. In addition to or in place of seal ring 26, a flexible seal ring 28 may be located in an annular groove 27 formed in the outer peripheral surface of auxiliary cylinder 21 so as to be held in contact with the inner peripheral surface of cylinder 6.

In accordance with the invention, limiting stopper means is provided on auxiliary cylinder 21 for driving cylinder 21 outwardly against the urging of seal ring 26 or 28 upon engagement of limiting stopper means by shoulder 72. Preferably, limiting stopper means is an inwardly projecting flange 22 formed at the end of cylinder 21 which receives piston 70 and positioned between projections 71 and 72 of piston 70.

In accordance with the invention, a flexible seal member 14' has a first end attached in sealing engagement to piston head 72a and a second end attached in sealing engagement to the inner surface 21a of the end 23 of auxiliary cylinder 21 axially opposed to piston head 72a. Seal member 14', together with auxiliary cylinder end 23 and piston head 72a, thus define a chamber 32 for receiving fluid pressure for actuation of piston 70. Preferably, a fluid pressure supply is communicated to chamber 32 through duct 9, aperture 16, the space 31 between the end of cylinder 6 and end 23 of cylinder 21, and an aperture 24 formed in end 23 of auxiliary cylinder 21.

During the operation of this piston-cylinder unit, piston 70 is actuated for movement in an axial direction by pressurized fluid being supplied and exhausted from chamber 32. This causes a force to act against piston head 72a. When fluid pressure is supplied to chamber 32 through duct 9, aperture 16, space 31, and aperture 24, and piston 70 is moved, brake pad 12 of brake pad member 8 is brought into engagement with brake disc 2. Over a period of time and through frequent operation, brake pad 12 will wear. Pad 12 may wear to such an extend that it is no longer brought into contact with brake disc 2 when piston 70 is axially displaced by the fluid pressure force until shoulder 72 of piston 70 comes into engagement with flange 22 of auxiliary cylinder 21. When this occurs, the urging or friction force of seal ring 26 against the outer peripheral surface of auxiliary cylinder 21 is exceeded by the force from piston 70 acting against flange 22 of cylinder 21. Piston 70 continues to move in an axial direction together with auxiliary cylinder 21 until brake pad 12 is brought into engagement with brake disc 2.

When the fluid pressure force is subsequently released, piston 70 returns to its initial axial position with respect to auxiliary cylinder 21 due to the restoring force of flexible seal member 14'. However, due to the continued friction or urging force of said ring 26 against the outer peripheral surface of cylinder 21, auxiliary cylinder 21 remains in its advanced or new axial position with respect to cylinder 6. By doing so, a new axial position of piston 70 is also established with respect to cylinder 6. During subsequent operations of the piston-cylinder unit, piston 70 again will be moved in an axial direction when hydraulically actuated, but will be displaced from its new axial position. It can be seen that, with the initial position of piston 70 being automatically adjusted according to the degree of wear of brake pad 12, a continued engaging action by brake pad 12 against brake disc 2 during subsequent braking operations is ensured.

Figure 4:
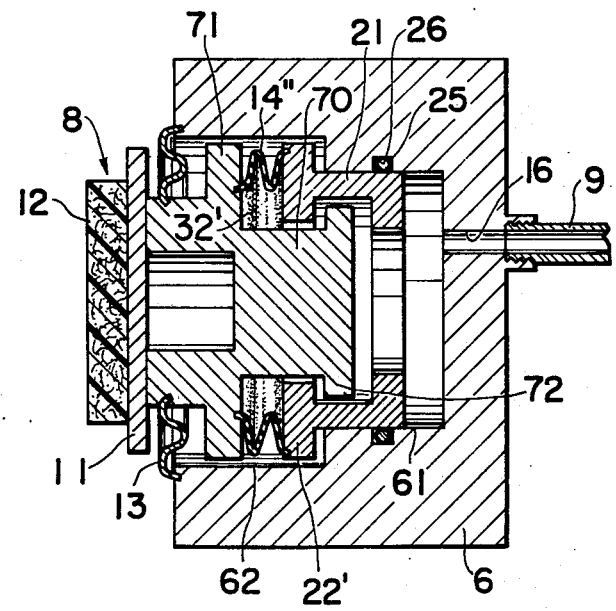
FIG. 4 is a sectional view of an embodiment of the piston-cylinder unit, similar to that of FIG. 3, for use in a disc brake assembly.

FIG. 4 shows another embodiment of the piston-cylinder unit of this invention for use in a disc brake assembly. This embodiment operates in a similar fashion to that of the FIG. 3 embodiment by providing an automatic adjustment in the axial position of the piston. Reference will therefore be primarily directed to the structural differences of this embodiment.

As here embodied, pot-shaped cylinder 6 is modified to be provided with a stepped bore, having a smaller diametrical portion 61 and a larger diameterical portion 62. Auxiliary cylinder 21 is received and guided in smaller diametrical portion 61 of cylinder 6 while radial projection 72 of piston 70 is received and guided in larger diametrical portion 62 of cylinder 6.

Radial projection 71 now forms a portion of the head of piston 70. Radial projection 72 again acts as a shoulder for engagement with limiting stopper means. Preferably, limiting stopper means is a flange 22' which projects both radially inwardly and outwardly and is formed at the end of cylinder 21 that receives piston 70. Flange 22' is positioned between projections 71 and 72 of piston 70.

In accordance with the invention, a flexible seal member 14" has a first end attached in sealing engagement to projection 71 and a second end attached in sealing engagement to flange 22' axially opposed to projection 71. Seal member 14", together with radial projection 71 and flange 22', thus define a chamber 32' for receiving fluid pressure for actuation of piston 70. Preferably, a fluid pressure supply is communicated to chamber 32' through duct 9, aperture 16, space 31, aperture 24, and finally through the clearance between auxiliary cylinder 21 and piston 70. A seal member, such as seal ring 26 or 28, is again provided being radially urged against the opposite surface for tending to maintain cylinder 21 in an axial position with respect to cylinder 6.

When piston 70 is actuated for axial movement by pressurized fluid being supplied and exhausted from chamber 32', brake pad 12 is brought into engagement with brake disc 2. As similarly described for the embodiment of FIG. 3, an automatic adjustment in the axial position of piston 70 with respect to cylinder 6 is provided by engagement of shoulder 72 with limiting stopper means of flange 22' to ensure engagement of brake pad 12 against brake disc 2 in subsequent braking operations.

As can be seen from the foregoing, the piston-cylinder unit of this invention provides a flexible seal member which is elastically deformable during axial movement of the piston and which acts as a restoring force to return the piston to its initial axial position upon removal of fluid pressure in the chamber defined by the flexible seal, piston, and cylinder. For this reason, the invention provides a piston-cylinder unit which will prevent insufficient or excessive return displacement of the piston to its initial axial position.

When used in a disc brake assembly, the piston-cylinder unit will prevent the dragging of the brake pad against the brake disc. Furthermore, by incorporating an auxiliary cylinder, the initial axial position of the piston with respect to the main cylinder can be automatically adjusted according to the wear of the brake pad to ensure engagement of the brake pad against the brake disc in subsequent braking operations.

It will be apparent to those skilled in the art that various modifications and variation could be made in the piston-cylinder unit of the invention without departing from the scope or spirit of the invention.

What is claimed is:

1. A piston-cylinder unit comprising:
   a. a cylinder having one open end and one closed end;
   b. a hydraulically actuated piston received in said cylinder for axial movement therein and having a piston head facing said closed end of said cylinder, and wherein an outer surface of said piston slidably engages an inner surface of said cylinder;
   c. a single flexible seal and biasing member having a first end fixedly attached in sealing engagement to said piston head and a second end fixedly attached in sealing engagement to said closed end of said clyinder axially opposed to said piston head for elastic expansion and contraction in an axial direction, said flexible seal and biasing member biasing said piston to a predetermined initial axial position and defining therein between said piston head and said closed end of said cylinder a chamber for receiving fluid pressure for actuation of said piston to thereby move said piston axially toward said open end of said cylinder; and
   d. flexible means interconnecting said piston and said cylinder by fixed connection at said open end of said cylinder for preventing particles such as dust and water droplets from entering between said slidably engaging surfaces of said piston and said cylinder through said open end of said cylinder.

2. The piston-cylinder unit of claim 1 wherein said flexible seal and biasing member comprises a bellows.

3. A piston-cylinder unit comprising:

a. a first cylinder having one open end and one closed end;
b. a second cylinder received in said first cylinder for axial movement therein and having at least one open end facing said open end of said first cylinder and wherein an outer surface of said second cylinder slidably engages an inner surface of said first cylinder;
c. a hydraulically actuated piston having portions received in said first and second cylinders for axial movement therein and having a piston head facing said closed end of said first cylinder, and wherein an outer surface of said piston slidably engages an inner surface of at least one of said first and second cylinders;
d. a single flexible seal and biasing member having a first end attached in sealing engagement to said piston head and a second end attached in sealing engagement to a portion of said second cylinder axially opposed to said piston head for elastic expansion and contraction in an axial direction, said flexible seal and biasing member biasing said piston to a predetermined initial axial position with respect to said second cylinder and defining therein between said piston head and said second cylinder a chamber for receiving fluid pressure for actuation of said piston to thereby move said piston axially toward said open end of said first cylinder; and
e. a seal member located on at least one of the slidably engaging surfaces of said first and second cylinders and radially urged against the opposite slidably engaging surface of said first and second cylinders for tending to maintain said second cylinder in an axial position with respect to said first cylinder.

4. The piston-cylinder unit of claim 3 also including means for communication between said chamber and said first cylinder, said fluid pressure being supplied through said communication means for actuation of said piston.

5. The piston-cylinder unit of claim 3 wherein said flexible seal and biasing member comprises a bellows.

6. The piston-cylinder unit of claim 5 further including flexible means interconnecting said piston and said first cylinder at said open end of said first cylinder for preventing particles such as dust and water droplets from entering between said piston, first cylinder and second cylinder through said open end of said first cylinder.

7. The piston-cylinder unit of claim 3 further including a shoulder on said piston and a limiting stopper means on said second cylinder for driving said second cylinder outwardly against the urging of said seal and biasing member upon engagement of said limiting stopper means by said shoulder under hydraulic pressure upon said piston head and for establishing a new axial position of said second cylinder with respect to said first cylinder upon release of said hydraulic pressure.

8. The piston-cylinder unit of claim 7 wherein two radial projections are located on said piston, one of said raidal projections being said shoulder located parallel to said piston head, and said limiting stopper means comprising a flange on said second cylinder located between the two radial projections on said piston for engaging said radial projections and tending to restrict axial movement of said piston.

9. The piston-cylinder unit of claim 7 wherein two radial projections are located on said piston, one of said radial projections being said shoulder and the other radial projection forming a portion of said piston head, and said limiting stopper means comprising a flange on said second cylinder located between the two radial projections on said piston for engaging said radial projections and tending to restrict axial movement of said piston.

10. A disc brake asembly for acting on a rotating brake disc comprising:
a. a caliper member positioned along a peripheral portion of said brake disc and having first and second arm sections;
b. a pot-shaped cylinder located on an inner side of at least one of said arm sections of the caliper member and having one end open and facing said brake disc;
c. a hydraulically actuated piston received in said cylinder for axial movement therein and having one end positioned in said open end of said cylinder to face said brake disc and a piston head facing the other end of said cylinder and wherein an outer surface of said piston slidably engages an inner surface of said cylinder;
d. a brake pad member attached to said piston end facing said brake disc;
e. a single flexible seal and biasing member having a first end attached in sealing engagement to said piston head and a second end attached in sealing engagement to said cylinder axially opposed to said piston head for elastic expansion and contraction in an axial direction, said flexible seal and biasing member biasing said piston to a predetermined initial axial position and defining therein between said piston head and said cylinder a chamber for receiving fluid pressure to cause axial displacement of said piston with respect to said caliper member so as to bring said brake pad member into engagement with said rotating brake disc; and
f. flexible means interconnecting said piston and said cylinder at said open end of said cylinder for preventing particles such as dust and water droplets from entering between said slidably engaging surfaces of said piston and said cylinder through said open end of said cylinder.

11. The disc brake assembly of claim 10 wherein said flexible seal and biasing member comprises a bellows.

12. A disc brake assembly for acting on a rotating brake disc comprising:
a. a caliper member positioned along a peripheral portion of said brake disc and having first and second arm sections;
b. a pot-shaped cylinder located on an inner side of at least one of said arm sections of the caliper member and having one end open and facing said brake disc;
c. a second cylinder received in said pot-shaped cylinder for axial movement therein and having at least one open end facing said open end of said pot-shaped cylinder and wherein an outer surface of said second cylinder slidably engages an inner surface of said pot-shaped cylinder;
d. a hydraulically actuated piston having portions received in said pot-shaped and second cylinders for axial movement therein and having one end positioned in said open end of said pot-shaped cylinder to face said brake disc and a piston head facing the other end of said pot-shaped cylinder and wherein an outer surface of said piston slidably engages an inner surface of at least one of said pot-shaped and second cylinders;

e. a brake pad member attached to said piston end facing said brake disc;

f. a single flexible seal and biasing member having a first end attached in sealing engagement to said piston head and a second end attached in sealing engagement to said second cylinder axially opposed to said piston head for elastic expansion and contraction in an axial direction, said flexible seal and biasing member biasing said piston to a predetermined initial axial position with respect to said second cylinder and defining therein between said piston head and said second cylinder a chamber for receiving fluid pressure to cause axial displacement of said piston with respect to said caliper member so as to bring said brake pad member into engagement with said rotating brake disc; and g. a seal member located on at least one of said slidably engaging surfaces of said pot-shaped and second cylinders and radially urged against the opposite slidably engaging surface of said pot-shaped and second cylinders for tending to maintain said second cylinder in an axial position with respect to said pot-shaped cylinder.

13. The disc brake assembly of claim 12 also including means for communication between said chamber and said pot-shaped cylinder, said fluid pressure being supplied through said communication means for actuation of said piston.

14. The disc brake assembly of claim 12 wherein said flexible seal and biasing member comprises a bellows.

15. The disc brake assembly of claim 12 further including flexible means interconnecting said piston and said pot-shaped cylinder at said open end of said pot-shaped cylinder for preventing particles such as dust and water droplets from entering between said piston, pot-shaped cylinder and second cylinder through said open end of said pot-shaped cylinder.

16. The disc brake assembly of claim 12 further including a shoulder on said piston and a limiting stopper means on said second cylinder for driving said second cylinder outwardly against the urging of said seal and biasing member upon engagement of said limiting stopper means by said shoulder under hydraulic pressure upon said piston head and for establishing a new axial position of said second cylinder with respect to said pot-shaped cylinder upon release of said hydraulic pressure.

17. The disc brake assembly of claim 16 wherein two radial projections are located on said piston, one of said radial projections being said shoulder located parallel to said piston head, and said limiting stopper means comprising a flange on said second cylinder located between the two radial projections on said piston for engaging said radial projections and tending to restrict axial movement of said piston.

18. The disc brake assembly of claim 16 wherein two radial projections are located on said piston, one of said radial projections being said shoulder and the other radial projection forming a portion of said piston head, and said limiting stopper means comprising a flange on said second cylinder located between the two radial projections on said piston for engaging said radial projections and tending to restrict axial movement of said piston.

* * * * *